(12) United States Patent
Lee et al.

(10) Patent No.: US 10,180,766 B2
(45) Date of Patent: Jan. 15, 2019

(54) THREE-DIMENSIONAL DISPLAY DEVICE AND USER INTERFACING METHOD THEREFOR

(71) Applicant: Samsung Electronics Co., Ltd., Suwon-si, Gyeonggi-do (KR)

(72) Inventors: Hyun Jeong Lee, Hwaseong-si (KR); Jae Joon Han, Seoul (KR); Joonah Park, Yongin-Si (KR); Yu Jin Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 451 days.

(21) Appl. No.: 14/439,148

(22) PCT Filed: Mar. 6, 2013

(86) PCT No.: PCT/KR2013/001807
§ 371 (c)(1),
(2) Date: Apr. 28, 2015

(87) PCT Pub. No.: WO2014/069722
PCT Pub. Date: May 8, 2014

(65) Prior Publication Data
US 2015/0293666 A1    Oct. 15, 2015

(30) Foreign Application Priority Data

Oct. 30, 2012   (KR) .................. 10-2012-0121328

(51) Int. Cl.
*G06F 3/0481*   (2013.01)
*G06F 3/0482*   (2013.01)
(Continued)

(52) U.S. Cl.
CPC ........ *G06F 3/04815* (2013.01); *G06F 3/0482* (2013.01); *G06F 3/04842* (2013.01); *H04N 13/04* (2013.01)

(58) Field of Classification Search
CPC . G06F 3/011; G06F 3/00; G06F 3/017; G06F 3/04815
See application file for complete search history.

(56) References Cited

U.S. PATENT DOCUMENTS

| 6,064,354 A | 5/2000 | DeLuca |
| 6,243,054 B1 | 6/2001 | DeLuca |

(Continued)

FOREIGN PATENT DOCUMENTS

| JP | 2001100906 A | 4/2001 |
| JP | 2003515804 A | 5/2003 |

(Continued)

OTHER PUBLICATIONS

International Search Report PCT/ISA/210 for International Application No. PCT/KR2013/001807 dated Jun. 25, 2013.
(Continued)

*Primary Examiner* — Namitha Pillai
(74) *Attorney, Agent, or Firm* — Harness, Dickey & Pierce, PLC

(57) ABSTRACT

A three-dimensional display device and a user interfacing method therefor are disclosed. The three-dimensional display device according to one embodiment comprises: a display unit for displaying a three-dimensional virtual object; a user input signal generation unit for generating a user input signal by detecting a handling object for handling an operation of the three-dimensional virtual object in a three-dimensional space matched with the three-dimen-
(Continued)

sional virtual object; and a control unit for controlling the operation of the three-dimensional virtual object according to the user input signal.

16 Claims, 20 Drawing Sheets

(51) Int. Cl.
*G06F 3/0484* (2013.01)
*H04N 13/04* (2006.01)

(56) References Cited

U.S. PATENT DOCUMENTS

| | | | |
|---|---|---|---|
| 6,417,969 | B1 | 7/2002 | DeLuca et al. |
| 6,559,813 | B1 | 5/2003 | DeLuca et al. |
| 7,069,516 | B2 | 6/2006 | Rekimoto |
| 7,881,901 | B2 | 2/2011 | Fein et al. |
| 2003/0001906 | A1 | 1/2003 | Light et al. |
| 2003/0142068 | A1 | 7/2003 | DeLuca et al. |
| 2011/0093778 | A1* | 4/2011 | Kim .................. G06F 3/041 715/702 |
| 2011/0107269 | A1 | 5/2011 | Chiu et al. |
| 2012/0206574 | A1 | 8/2012 | Shikata et al. |
| 2012/0223882 | A1 | 9/2012 | Galor et al. |

FOREIGN PATENT DOCUMENTS

| | | |
|---|---|---|
| JP | 2007317050 A | 12/2007 |
| JP | 2008257442 A | 10/2008 |
| JP | 2009500751 A | 1/2009 |
| JP | 2009098987 A | 5/2009 |
| KR | 20080054762 A | 6/2008 |
| KR | 2010-0063793 A | 6/2010 |
| KR | 20110045589 A | 5/2011 |
| KR | 20110054256 A | 5/2011 |
| KR | 20110112606 A | 10/2011 |
| KR | 20110116487 A | 10/2011 |
| KR | 20120000663 A | 1/2012 |
| KR | 20120009897 A | 2/2012 |
| KR | 20120048191 A | 5/2012 |

OTHER PUBLICATIONS

Written Opinion of the International Searching Authority PCT/ISA/237 for International Application No. PCT/KR2013/001807 dated Jun. 25, 2013.
Korean Office Action dated Jun. 15, 2018 in corresponding Korean Application No. 10-2012-0121328 (with translation).

* cited by examiner

THREE-DIMENSIONAL DISPLAY DEVICE AND USER INTERFACING METHOD THEREFOR

CROSS-REFERENCE TO RELATED APPLICATIONS

This application is the national phase application under 35 U.S.C. § 371 of PCT International Application No. PCT/KR2013/001807 which has an International filing date of Mar. 6, 2013, which designated the United States of America, and which claims priority to Korean patent application number KR 10-2012-0121328 filed Oct. 30, 2012, the entire contents of each of which are hereby incorporated herein by reference.

TECHNICAL FIELD

Embodiments relate to a three-dimensional (3D) display device and a user interface method thereof, and more particularly, to providing a user interface available in a 3D display environment.

RELATED ART

Recently, a three-dimensional (3D) display device for displaying a 3D image is in commercialization. Further, the use range of the 3D display device has been expanded to a variety of fields such as medical or military applications in addition to a home, a company, and an industrial field.

The 3D display device performs an operation corresponding to a user input. The 3D display device according to the related art provides a two-dimensional (2D) user interface for the user input.

The 3D display device detects a user input in an X-axial direction that is a reference axis and a user input in a Y-axial direction vertical to an X axis on the plane of the 2D user interface, and performs an operation corresponding to the detected user input. The 2D user input method provides a limited user interface in a 3D display environment.

DESCRIPTION OF INVENTION

Some example embodiments relate to a three-dimensional (3D) display device including a display configured to display a 3D virtual object; a user input signal generator configured to generate a user input signal by detecting a manipulating object for manipulating an operation of the 3D virtual object on a 3D space matched with the 3D virtual object, and a controller configured to control an operation of the 3D virtual object according to the user input signal.

Other example embodiments relate to a user interface method of a 3D display device, the method including displaying a 3D virtual object; generating a user input signal by detecting a manipulating object for manipulating an operation of the 3D virtual object on a 3D space matched with the 3D virtual object, and controlling an operation of the 3D virtual object according to the user input signal.

DETAILED DESCRIPTION

Figure 1:
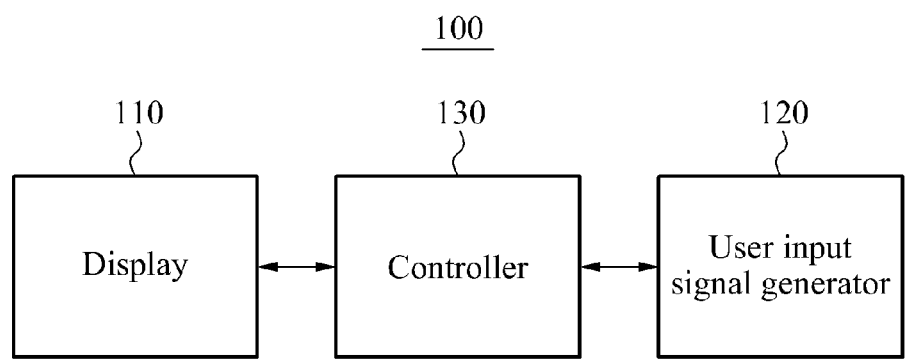
FIG. 1 is a block diagram illustrating a configuration of a three-dimensional (3D) display device according to an embodiment.

Hereinafter, embodiments will be described with reference to the accompanying drawings.

When it is determined detailed description related to a related known function or configuration they may make the purpose of the embodiments unnecessarily ambiguous in describing the embodiments, the detailed description will be omitted here. Also, terminologies used herein are defined to appropriately describe the embodiments and thus, may be changed depending on a user, the intent of an operator, or a custom. Accordingly, the terminologies must be defined based on the following overall description of this specification. Like reference numerals illustrated in the respective drawings refer to like constituent elements throughout.

FIG. 1 is a block diagram illustrating a configuration of a three-dimensional (3D) display device according to an embodiment. The 3D display device 100 of FIG. 1 refers to a device for displaying a variety of contents as 3D virtual objects, and may be a portable device or a mobile device including a 3D television (TV) function, a 3D monitor function, and a 3D display function and may be a 3D hologram device.

The 3D display device 100 includes a display 110, a user input signal generator 120, and a controller 130, and may provide a user interface capable of readily controlling an operation of a 3D virtual object. The controller 130 controls an operation of the display 110 and the user input signal generator 120.

The display 110 displays a 3D virtual object. The 3D virtual object may be a two-dimensional (2D) or 3D video or a 2D or 3D image, and may be a control screen for controlling an operation of the 3D display device 100. Alternatively, the display 110 may be a 3D cubic area for displaying a video or an image. The 3D virtual object may be displayed using a stereoscopic method, or may be displayed using a hologram method for realizing a cubic image in all directions of 360 degrees.

The user input signal generator 120 may provide a user interface of interacting with a user to control an operation of the 3D display device 100.

The user input signal generator 120 generates a user input signal by detecting a manipulating object for manipulating an operation of the 3D virtual object. In detail, when the 3D virtual object is displayed, the user input signal generator 120 generates a 3D space matched with the 3D virtual object. The user input signal generator 120 generates a user input signal by detecting the manipulating object for manipulating an operation of the 3D virtual object in the 3D space matched with the 3D virtual object.

The manipulating object may be at least one of a user body, an object, and a portable device having a communication function. However, it is only an example and thus, any of controlling an operation of the 3D virtual object may be used as the manipulating object.

The user body used as the manipulating object may refer to a portion of a body of a user, such as a finger and an elbow. The object may refer to a touch pen or a pointer, and may be an object including a marker recognizable by the 3D display device 100 or to which the marker is attached. Further, the portable device may refer to a portable device capable of performing a near-field radio communication such as wireless fidelity (Wi-Fi), Bluetooth, ZigBee, and near field communication (NFC), and may refer to a portable communication device capable of performing a video communication and voice communication.

The user input signal generated by the user input signal generator 120 may include a store/read signal of a file or data on the 3D virtual object, a transmission/reception signal of the file or data on the 3D virtual object, an execution signal of a file/data/application on the 3D virtual object, and a data transmission/reception signal with an external device. However, it is only an example and thus, the user input signal may include all of a signal associated with an operation of the 3D display device 100 and a signal associated with an operation of the 3D virtual object.

The controller 130 controls an operation of the 3D virtual object according to the user input signal.

The 3D display device 100 of FIG. 1 may generate a user input signal by detecting the manipulating object in the 3D space matched with the 3D virtual object, thereby providing a user interface suitable for a 3D display environment.

Figure 2:
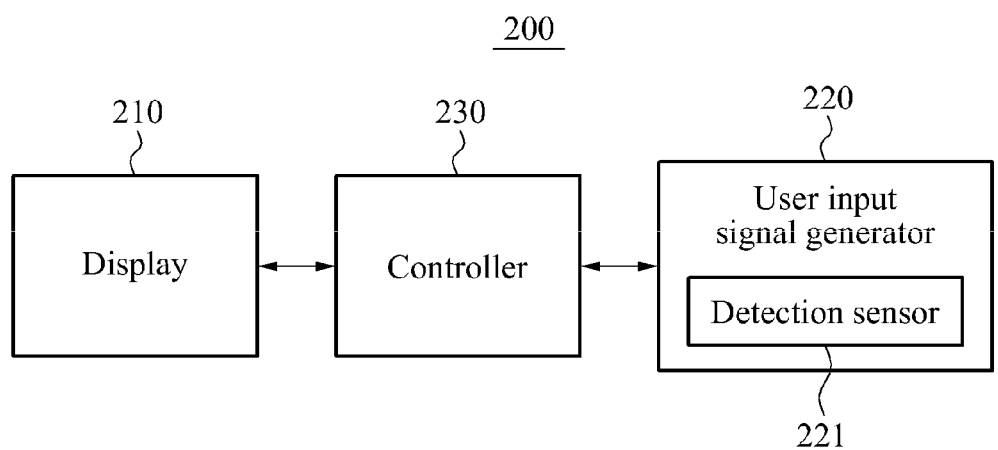
FIGS. 2 through 5 are block diagrams illustrating a configuration of a 3D display device according to various embodiments.
Figure 3:
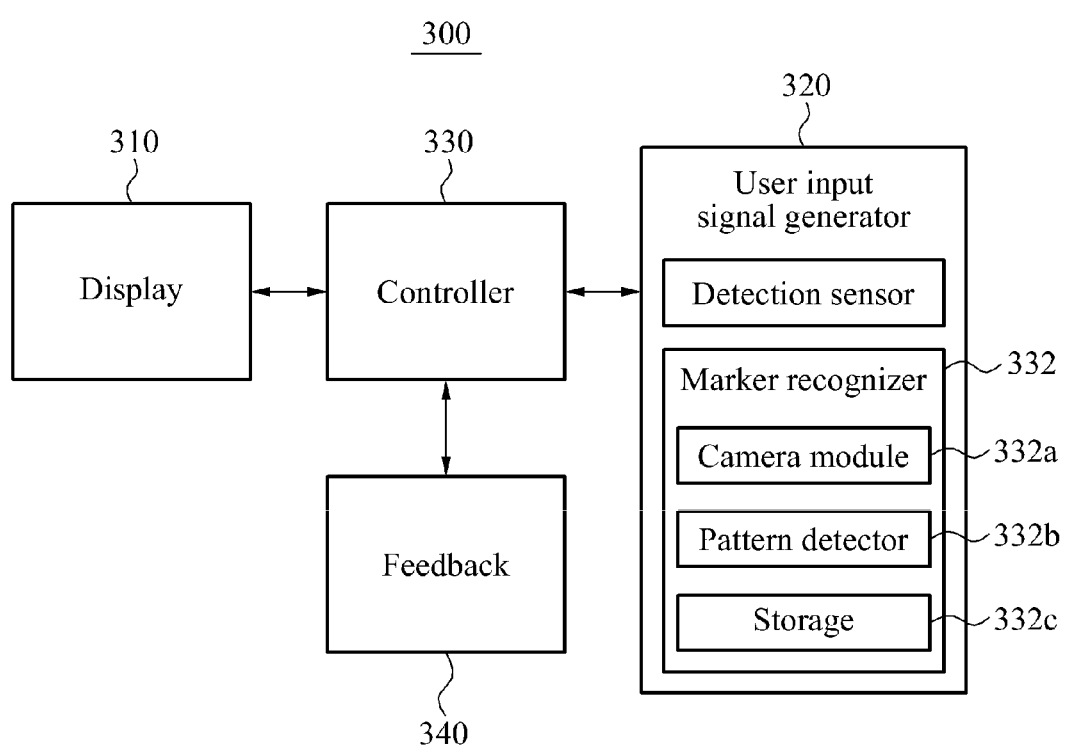
Figure 4:
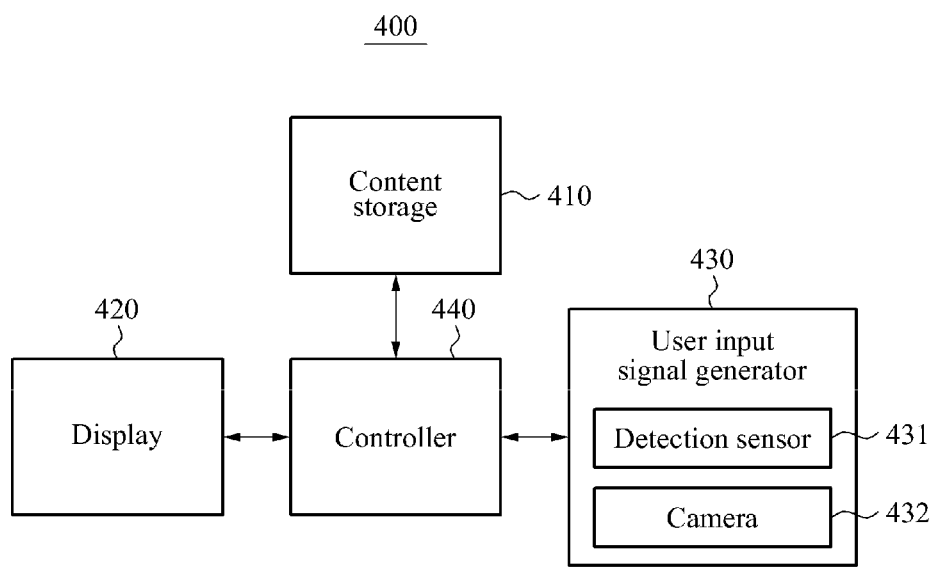

FIGS. 2 through 4 are block diagrams illustrating a configuration of a 3D display device according to embodiments.

Referring to FIG. 2, the 3D display device 200 includes a display 210, a user input signal generator 220, and a controller 230, and may provide a user interface capable of readily controlling an operation of a 3D virtual object.

The display 210 displays the 3D virtual object.

The user input signal generator 220 may provide a user interface of interacting with a user to control an operation of the 3D display device 200.

The user input signal generator 220 may include a detection sensor 221 to detect a manipulating object. The detection sensor 221 may detect an occurrence of any contact or insertion in a 3D space matched with the 3D virtual object, or may detect an occurrence of any approach in a detection distance from the 3D space. The detection sensor 221 may be an infrared (IR) sensor and an ultrasound sensor.

According to an embodiment, when the manipulating object is detected in the 3D space, the user input signal generator 220 may track x, y, z coordinate information in the 3D space along a contact and a movement of the manipulating object. In detail, the user input signal generator 220 may detect a contact and a movement of the manipulating object and may track x, y, z coordinate information corresponding thereto through the detection sensor 221.

The controller 230 may control an operation of the 3D virtual object corresponding to the x, y, z coordinate information by applying the x, y, z coordinate information included in the user input signal to the 3D virtual object matched with the 3D space.

For example, when a contact of the manipulating object at a first location of the 3D space matched with the 3D virtual object is detected in a state in which a first file is positioned at the first location of the 3D virtual object, the user input signal generator 220 may track x, y, z coordinate information of the first location. When a movement of the manipulating object from the first location to a second location is detected, the user input signal generator 220 may track x, y, z coordinate information along a movement route from the first location to the second location. As described above, the user input signal generator 220 may generate the user input signal by tracking the x, y, z coordinate information along the contact and the movement of the manipulating object. In this case, the controller 230 may select the first file positioned at the first location of the 3D virtual object based on the x, y, z coordinate information included in the user input signal, and may control an operation for moving the first file from the first location to the second location. That is, the controller 230 may control a drag-and-drop operation of dragging the first file at the first location and dropping the first file at the second location on the 3D virtual object.

The 3D display device 200 of FIG. 2 may provide a user interface of the 3D space matched with the 3D virtual object. The 3D display device 200 may provide a user interface suitable for a 3D display environment.

FIG. 3 is a block diagram illustrating a configuration of a 3D display device according to another embodiment. Referring to FIG. 3, the 3D display device 300 may include a display 310, a user input signal generator 320, a controller 330, and a feedback 340.

The display 310 may display a 3D virtual object. The 3D virtual object may include the aforementioned contents.

The user input signal generator 320 may provide a user interface for interacting with a user to control an operation of the 3D display device 300, and may include a detection sensor 331 and a marker recognizer 332.

The detection sensor 331 may detect an occurrence of any contact or insertion in a 3D space matched with the 3D virtual object, or may detect an occurrence of any approach in a detection distance from the 3D space. The detection sensor 331 may be an IR sensor and an ultrasound sensor, and may be any sensor capable of detecting a manipulating object in the 3D space.

The marker recognizer 332 may recognize a marker provided in the manipulating object, and may acquire information of the manipulating object corresponding to the recognized marker. The marker recognizer 332 may include a camera module 332*a* capable of photographing the marker, a pattern detector 332*b* capable of detecting a predetermined pattern from the photographed marker, and storage 332*c* configured to store information of the manipulating object corresponding to the detected pattern.

Information of the manipulating object may include 2D or 3D video or image data indicating the manipulating object, a 2D or 3D game, a 3D avatar, and an application with respect to a variety of markers. Further, information of the manipulating object may include web server address information at which the 2D or 3D video or image data, the 2D or 3D game, the 3D avatar, and the application can be acquired. Further, when the manipulating object is a product, information of the manipulating object may further include information such as a provider, a created date, an online or offline sales location, and a price of the manipulating object.

The user input signal generator 320 may generate the user input signal including information of the manipulating object by acquiring information of the manipulating object based on the marker recognition by the marker recognizer 332.

The controller 330 may control an operation of the 3D virtual object to display information of the manipulating object included in the user input signal or to transmit information of the manipulating object to another display device.

For example, when the manipulating object is detected in the 3D space, the user input signal generator 320 may recognize a marker provided in the manipulating object through the marker recognizer 332 and may acquire information of the manipulating object corresponding to the recognized marker. When the manipulating object is an object such as a doll, the marker may include a predetermined pattern corresponding to the doll. Accordingly, the user input signal generator 320 may acquire information of the doll corresponding to the marker based on the marker recognition and may generate the user input signal including information of the doll. In this example, the controller 330 may display information of the doll included in the user input signal on the 3D virtual object or may transmit information of the doll to another display device communicating with the 3D display device 300.

When any contact or insertion occurs in the 3D space matched with the 3D virtual object or when any approach occurs in the detection distance from the 3D space, the feedback 340 may output a feedback signal such as a visual signal, an auditory signal, and a tactile signal in response to the occurrence of the contact, the insertion, or the approach. The operation of the feedback 340 may be controlled by the controller 330.

In detail, when the manipulating object is detected in the 3D space, the user input signal generator 320 may transfer a notification signal indicating a detection of the manipulating object to the controller 330, and the controller 330 may control an operation of the feedback 340 according to the notification signal.

The user may be informed that the manipulating object has contacted, inserted, or approached in the 3D space based on a feedback signal such as a visual signal, an auditory signal, and a tactile signal output through the feedback 340.

The 3D display device 300 of FIG. 3 may provide a user interface of the 3D space matched with the 3D virtual object. Accordingly, the 3D display device 300 may provide a user interface suitable for a 3D display environment.

FIG. 4 is a block diagram illustrating a configuration of a 3D display device 400 according to another embodiment. Referring to FIG. 4, the 3D display device 400 may include a content storage 410, a display 420, a user input signal generator 430, and a controller 440.

The content storage 410 may store a variety of contents to be displayed as a 3D virtual object.

The display 420 may display the 3D virtual object. The 3D virtual object may be contents stored in the content storage 410.

The user input signal generator 430 may provide a user interface of interacting with a user to control an operation of the 3D display device 400, and may include a detection sensor 431 and a camera 432.

The detection sensor 431 may detect an occurrence of any contact or insertion in a 3D space matched with the 3D virtual object, or may detect an occurrence of any approach in a detection distance from the 3D space.

When the manipulating object in the 3D space is detected, the camera 432 generates a manipulating object image by photographing the manipulating object.

The user input signal generator 430 may generate a user input signal including the manipulating object image.

The controller 440 controls an operation of the 3D virtual object according to the user input signal.

According to an embodiment, the controller 440 controls an operation of the 3D virtual object to display the manipulating object image included in the user input signal or to transmit a shape of the manipulating object to another display device.

For example, when a manipulating object is detected in the 3D space, the user input signal generator 430 may generate a manipulating object image by photographing the manipulating object through the camera 432. When the manipulating object is flower, the camera 432 may generate a flower image by photographing the flower. Accordingly, the user input signal generator 430 may generate the user input signal including the flower image. In this example, the controller 440 may display the flower image included in the user input signal on the 3D virtual object, or may transmit the flower image to another display device communicating with the 3D display device 400.

According to another embodiment, the controller 440 may control an operation of the 3D virtual object to verify a representative pixel value by analyzing a manipulating object image included in a user input signal, and to display a 3D manipulating object by applying the representative pixel value to the 3D manipulating object. In detail, the controller 440 may determine a most frequently used pixel value as the representative value or may determine the average pixel value of the entire pixels as the representative pixel value by verifying pixel values of the entire pixels constituting the manipulating object image. The controller 440 may display the 3D virtual object so that the 3D virtual object may have the representative pixel value.

According to another embodiment, the controller 440 may control an operation of the 3D virtual object to generate shape information of a manipulating object based on a manipulating object image included in a user input signal, and to display the shape information of the manipulating object.

For example, when photographing a rectangular-shaped box using the camera 432, a manipulating object image including the box may be generated. The controller 440 may generate shape information of a manipulating object by detecting the manipulating object from the manipulating object image. Shape information of the manipulating object may be 2D image data or 3D image data indicating a shape or a state of the manipulating object. Accordingly, the controller 440 may control an operation of the 3D virtual object to display 2D square image data or 3D rectangular image data corresponding to the box that is the manipulating object.

According to another embodiment, when a manipulating object is detected in a 3D space during an execution of content, the user input signal generator 430 may link the manipulating object and the content in execution, and may generate a user input signal including the manipulating object and the content.

In detail, when the manipulating object is detected in the 3D space during the execution of the content, the camera 432 may generate a manipulating object image by photographing the manipulating object.

The user input signal generator 430 may detect the manipulating object from the manipulating object image generated by the camera 432, may link the manipulating object and the content in execution, and may generate the user input signal including the linked manipulating object and content.

The controller 440 may store the manipulating object and the content included in the user input signal, in the content storage 410 or a separate memory.

When the manipulating object is detected again in the 3D space, the user input signal generator 430 may read the content linked to the manipulating object and may generate a user input signal for executing the content. During the above process, the user input signal generator 430 may determine whether the manipulating object is detected again by detecting the manipulating object from the manipulating object image.

The controller 440 may read the content linked to the manipulating object from the content storage 410 or the separate memory and may display the read content on the 3D space. According to the embodiment, a user may further easily execute content by linking the content and a manipulating object frequently used by the user.

Figure 5:
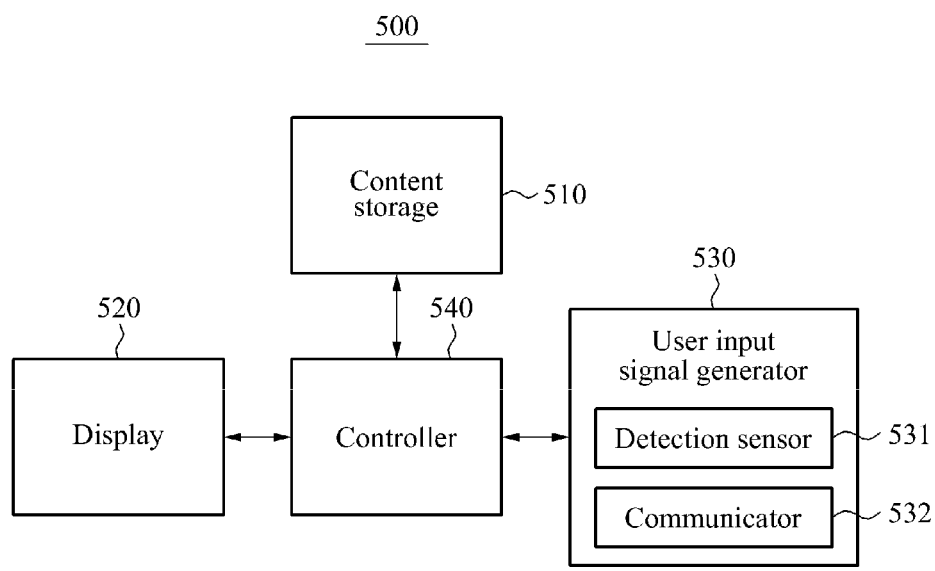

FIG. 5 is a block diagram illustrating a configuration of a 3D display device according to another embodiment. Referring to FIG. 5, the 3D display device 500 may include a content storage 510, a display 520, a user input signal generator 530, and a controller 540.

The content storage 510 may store a variety of contents to be displayed as a 3D virtual object.

The display 520 may display the 3D virtual object. The 3D virtual object may be contents stored in the content storage 510.

The user input signal generator 530 may provide a user interface of interacting with a user to control an operation of the 3D display device 500, and may include a detection sensor 531 and a communicator 532.

The detection sensor 531 may detect an occurrence of any contact or insertion in a 3D space matched with the 3D virtual object, or may detect an occurrence of any approach in a detection distance from the 3D space.

The communicator 532 communicates with a portable device having a communication function. When a manipulating object is detected in the 3D space, the communicator 532 may communicate with the portable device having contacted, inserted, or approached in the 3D space by activating the communication function.

The user input signal generator 530 may generate a user input signal including content by receiving the content selected in advance in the portable device through the communicator 532.

The controller 540 may control an operation of the 3D virtual object to execute the content included in the user input signal.

For example, when a portable device is detected in the 3D space, the communicator 532 may receive content selected in advance in the portable through communication with the portable device. When the content is a movie, the communicator 532 may receive a movie from the portable device. Accordingly, the user input signal generator 530 may generate a user input signal including the movie. In this case, the controller 540 may execute the movie included in the user input signal and may display the movie on the 3D virtual object.

Although the 3D display devices 200, 300, 400, and 500 according to individual embodiments are illustrated and described in FIGS. 2 through 5, the 3D display devices 200, 300, 400, and 500 may be configured using a combination of various embodiments.

FIGS. 6A through 10B are diagrams to describe a user interface method according to various embodiments.

Figure 6A:
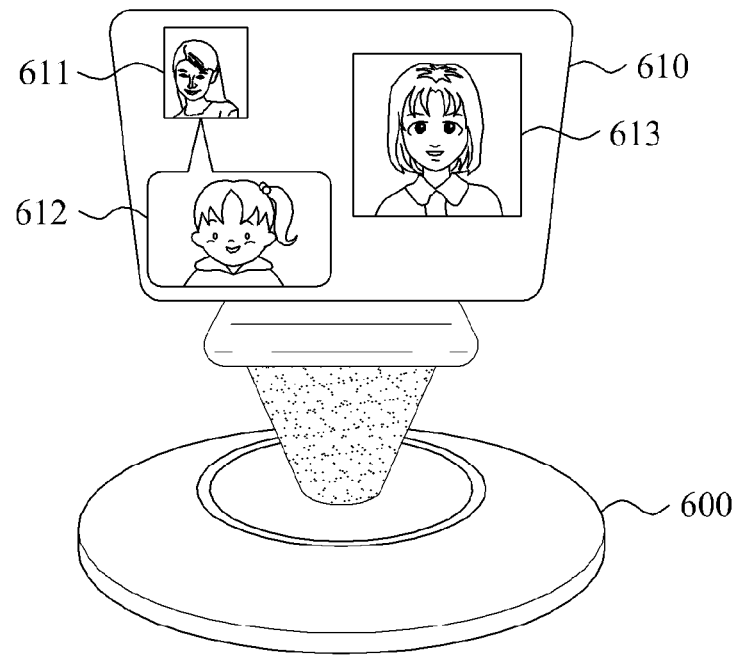
FIGS. 6A through 13 are diagrams to describe a user interface method according to various embodiments.
Figure 6B:
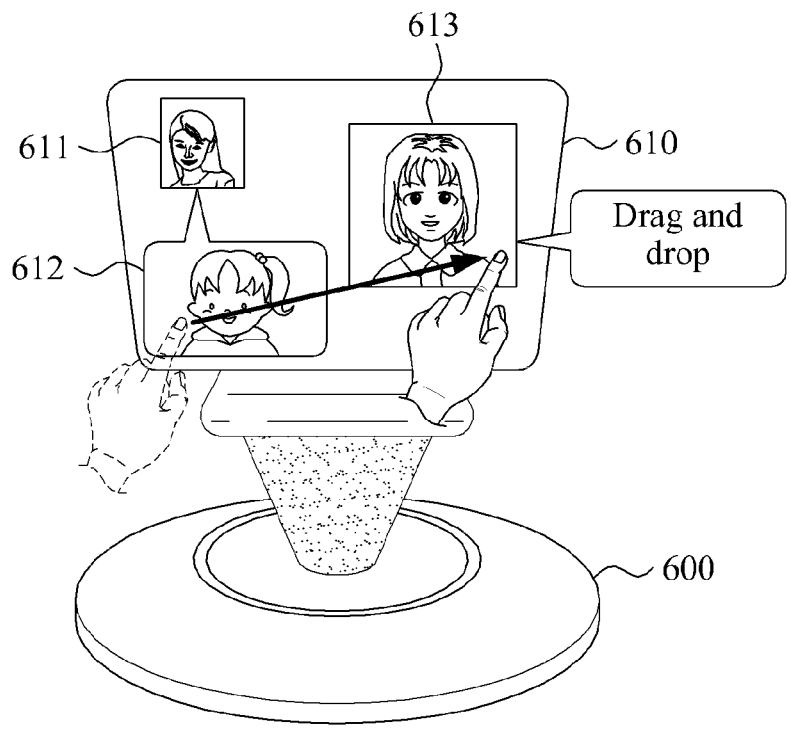
Figure 6C:
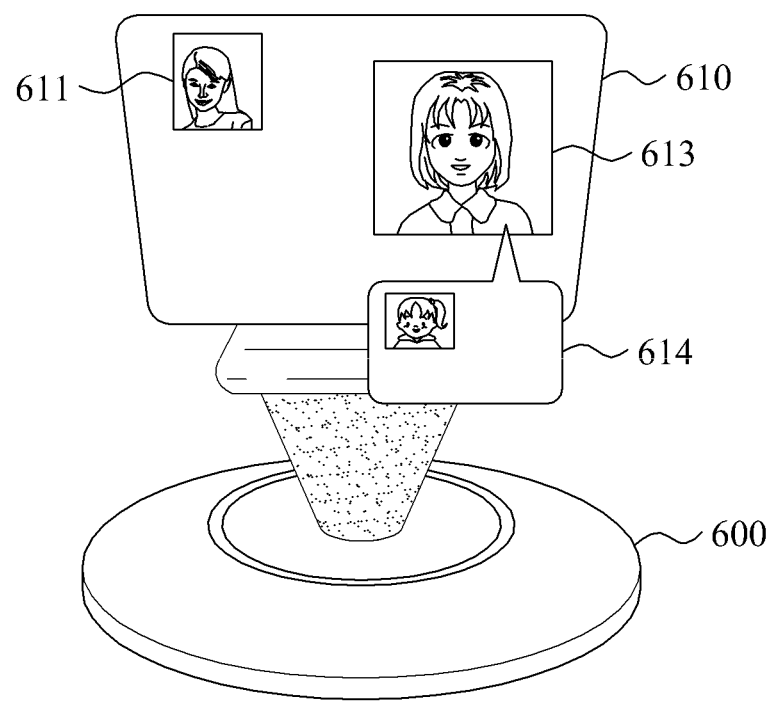

FIGS. 6A through 6C are diagrams to describe a user interface method of controlling an operation of a 3D virtual object using a finger contact.

Referring to FIG. 6A, a 3D display device 600 displays a 3D virtual object 610. Although the 3D virtual object 610 is illustrated on a 2D plane, the 3D virtual object 610 may be displayed as a cubic image such as a 3D hologram in an actual environment.

The 3D virtual object 610 may relate to a video communication image between a first user and a second user. The 3D virtual object 610 includes a first user area 611 and a second user area 613.

The first user area 611 refers to an area on which the first user using the 3D display device 600 is displayed. A first content area 612 on which contents stored in the 3D display device 600 are listed may be positioned at a lower end of the first user area 611. In addition, the second user area 613 refers to an area on which the second user making a video communication with the first user is displayed.

The 3D display device 600 may detect a manipulating object by generating a virtual 3D space matched with the 3D virtual object 610.

Referring to FIG. 6B, when the first user locates a finger on the first content area 612 and moves the finger to the second user area 613, the 3D display device 600 may transmit contents listed on the first content area 612 to the second user using a drag-and-drop method. Accordingly, as illustrated in FIG. 6C, the contents transmitted to the second user may be displayed on a second content area 614 positioned at a lower end of the second user area 613.

That is, according to the embodiment of FIGS. 6A through 6C, the 3D display device 600 may generate a user input signal for drag-and-drop by tracking x, y, z coordinate information along a contact and a movement of the manipulating object in the 3D space. Accordingly, the 3D display device 600 may drag and drop the content on a second user area by applying, the x, y, z coordinate information to the 3D virtual object 610.

Figure 7A:
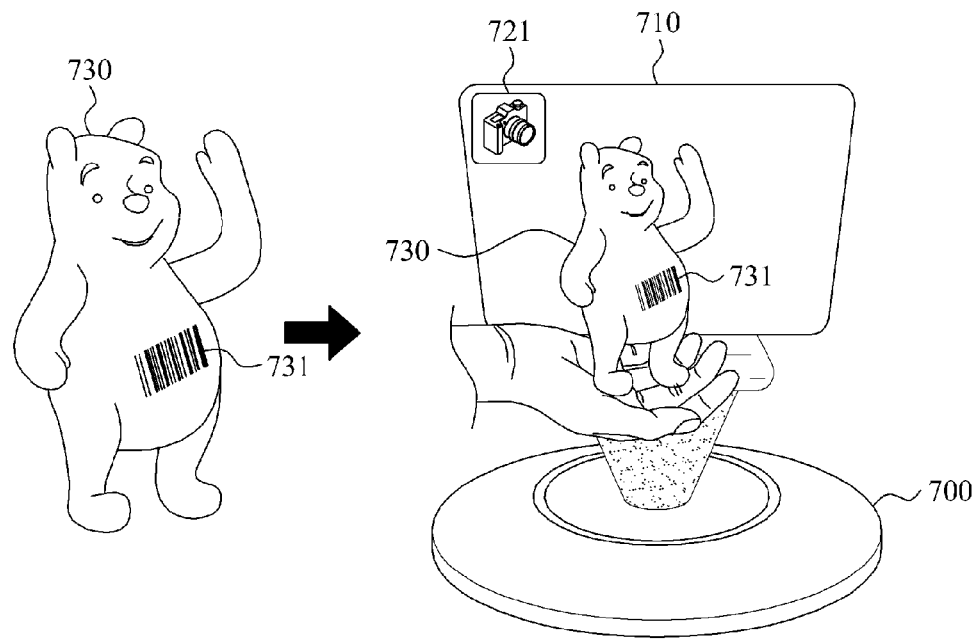
Figure 7B:
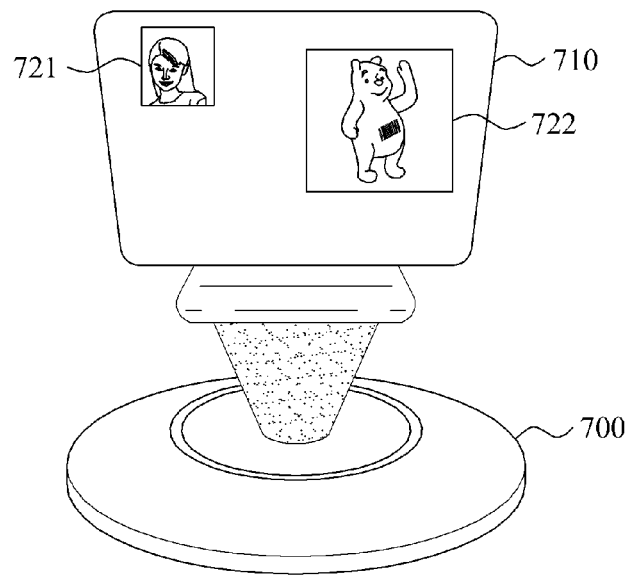

FIGS. 7A and 7B are diagrams to describe a user interface method of controlling an operation of a 3D virtual object based on a mark recognition.

Referring to FIG. 7A, a 3D display device 700 displays a 3D virtual object 710. The 3D display device 700 may include a camera module 721 for recognizing a marker on one area.

When a manipulating object is detected in a 3D space matched with the 3D virtual object 710, the 3D display device 700 may recognize the marker provided in the manipulating object through the camera module 721. Referring to FIG. 7A, when a contacts, an insertion, or an approach of a doll 730 including a marker 731 is detected in a 3D space, the camera module 721 may acquire doll information corresponding to the marker 731 by recognizing the marker 731. The doll information may include a 2D or 3D image, a provider, a created date, an online or offline sales location, and a price of the doll.

Referring to FIG. 7B, the 3D display device 700 may generate a user input signal to display information of the doll acquired based on a marker recognition or to transmit information of the doll to another display device. Accordingly, the 3D display device 700 may display doll information on the 3D virtual object 710.

An example of a marker provided to a doll is described with reference to FIGS. 7A and 7B, a shape of a manipulating object may be acquired by using the marker as the manipulating object instead of using an object such as the doll as the manipulating object.

Figure 8A:
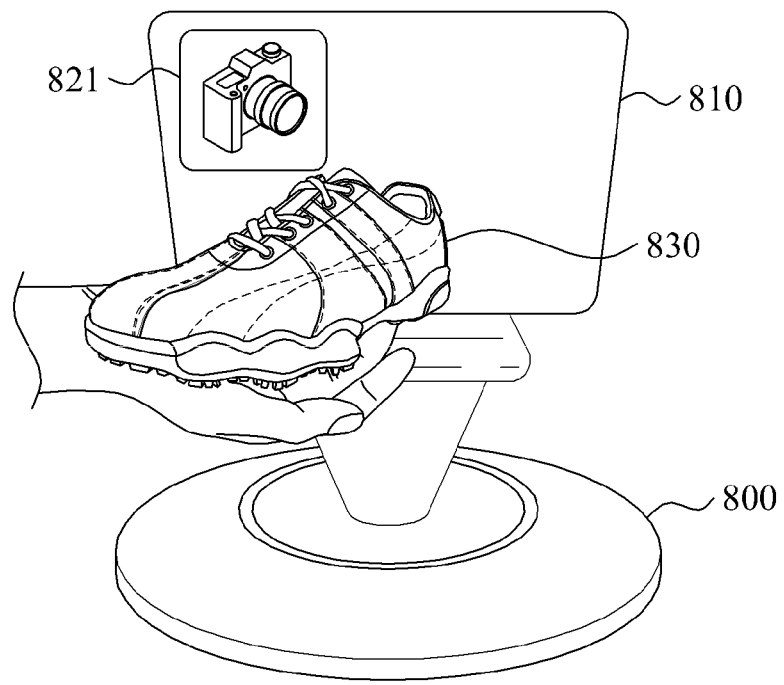
Figure 8B:
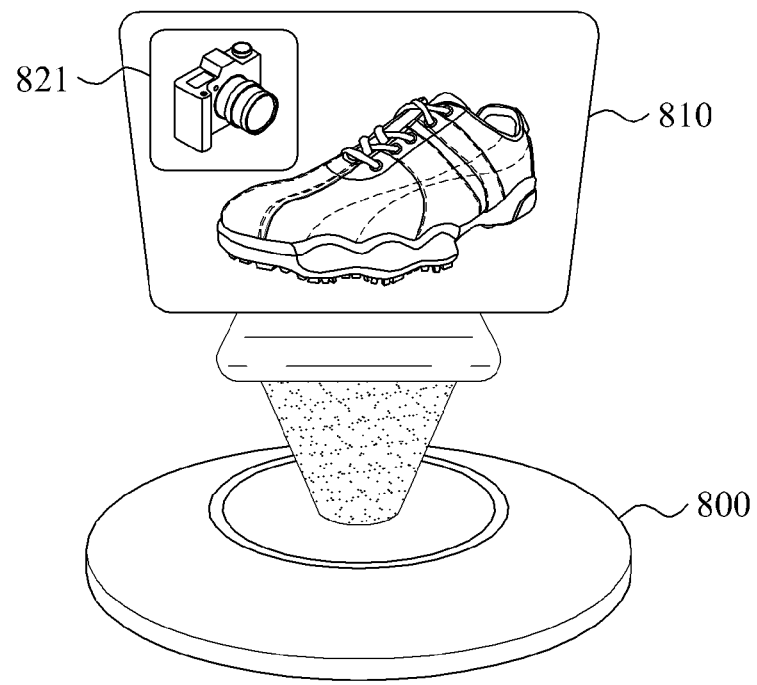

FIGS. 8A and 8B are diagrams to describe a user interface method of controlling an operation of a 3D virtual object by photographing a manipulating object.

Referring to FIG. 8A, a 3D display device 800 displays a 3D virtual object 810. The 3D display device 800 may include a camera 821 on one area.

When the manipulating object is detected in a 3D space matched with the 3D virtual object 810, the 3D display device 800 may photograph the manipulating object using the camera 821. That is, referring to FIG. 8A, when a contact, an insert, or an approach of sneakers 830 is detected in the 3D space, the camera 821 may generate a sneakers image by photographing the sneakers 830.

The 3D display device 800 may generate a user input signal to display the sneakers image and may display the sneakers image on the 3D virtual object 810 in response to the user input signal.

Figure 9A:
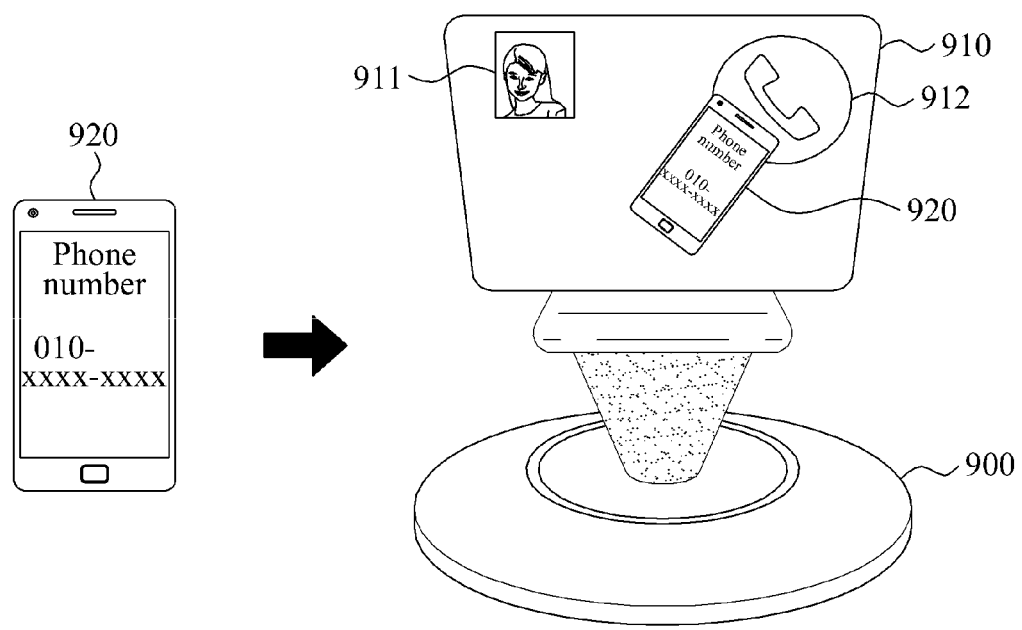
Figure 9B:
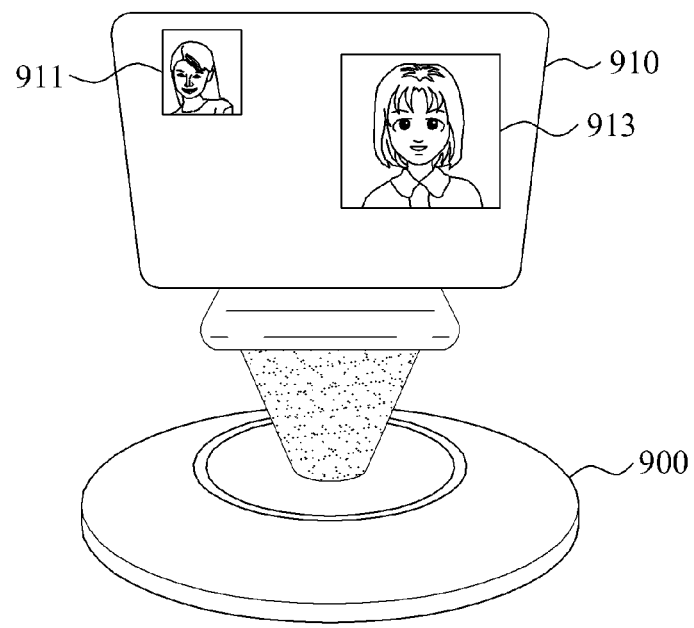

FIGS. 9A and 9B are diagrams to describe a user interface method of controlling an operation of a 3D virtual object using a portable device.

Referring to FIG. 9A, a 3D display device 900 displays a 3D virtual object 910. The 3D virtual object 910 may include a first user area 911 for displaying a first user and a call execution area 912 as a video call image. When the 3D display device 900 detects a contact, an insertion, or an approach of a portable device 920, the 3D display device 900 may receive content selected in advance in the portable device 920, for example, a contact number of a second user and may generate a user input signal including the contact number.

The 3D display device 900 enables the first user and the second user to make a video call by making a call at the contact number included in the user input signal. Here, the 3D display device 900 may display a second user area 913 for displaying the second user.

An example of the 3D display device 900 receiving content stored in the portable device 920 is described above with reference to FIGS. 9A and 9A. On the contrary, the content stored in the 3D display device 900 may be transmitted to the portable device 920. This example is described with reference to FIGS. 10A and 10B.

Figure 10A:
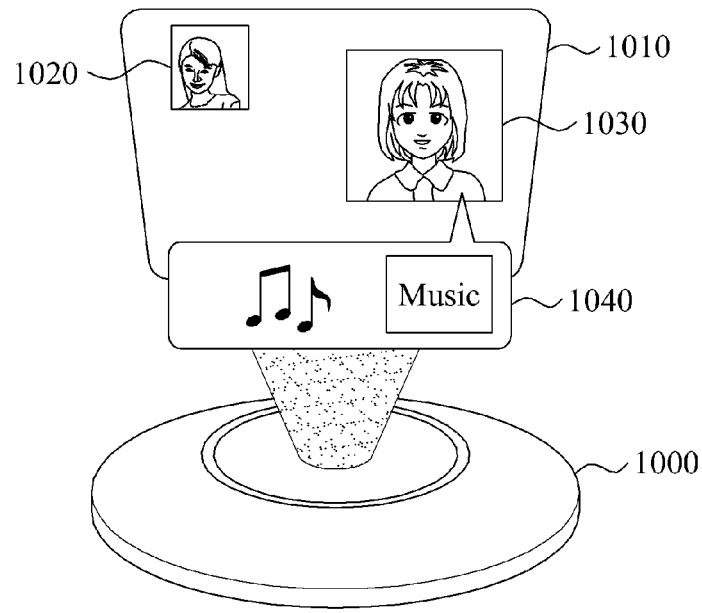

Referring to FIG. 10A, a 3D display device 1000 displays a 3D virtual object 1010. The 3D virtual object 1010 may include a first user area 1020 for displaying a first user and a second user area 1030 for displaying a second user as a video call image between the first user and the second user.

Figure 10B:
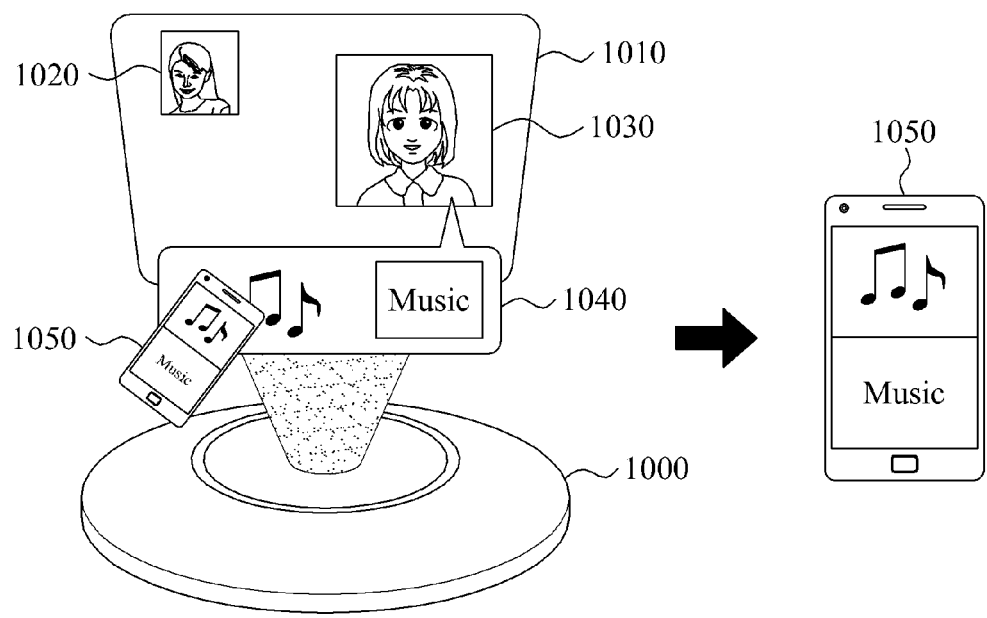

When the 3D display device 1000 detects a contact, an insertion, or an approach of a portable device 1050 in a state in which a music file is shared between the first user and the second user through the 3D virtual object 1010 or a music file is listed to a content area 1040 of the second user, the 3D display device 1000 may generate a user input signal for transmitting the music file to the portable device 1050. In response to the user input signal, the 3D display device 1000 may transmit the music file to the portable device 1050 and the portable device 1050 may receive and play back the music file as illustrated in FIG. 10B.

Figure 11A:
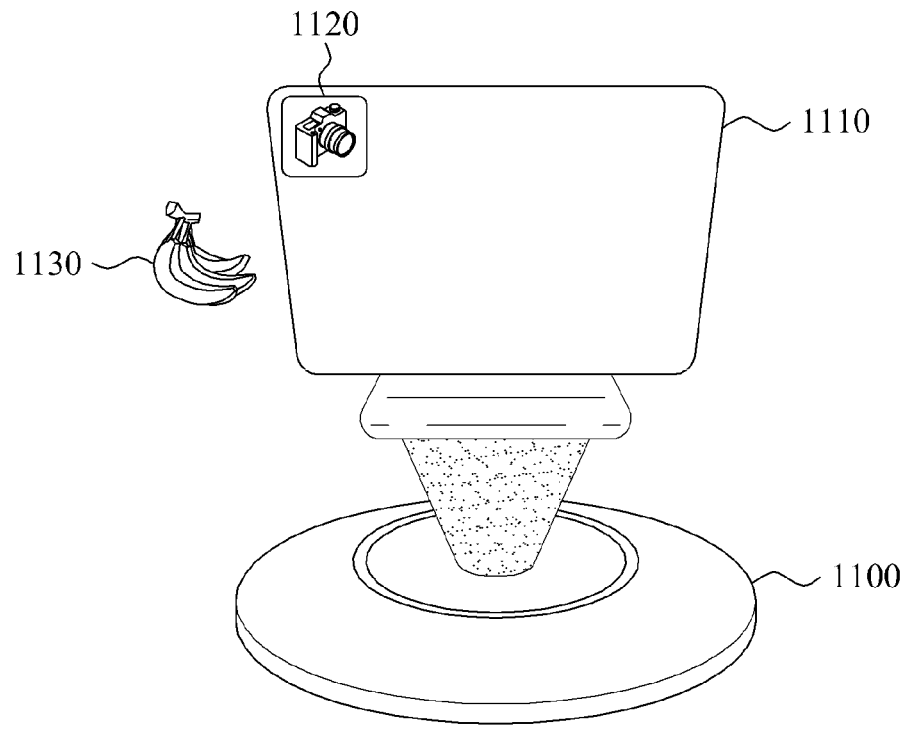
Figure 11B:
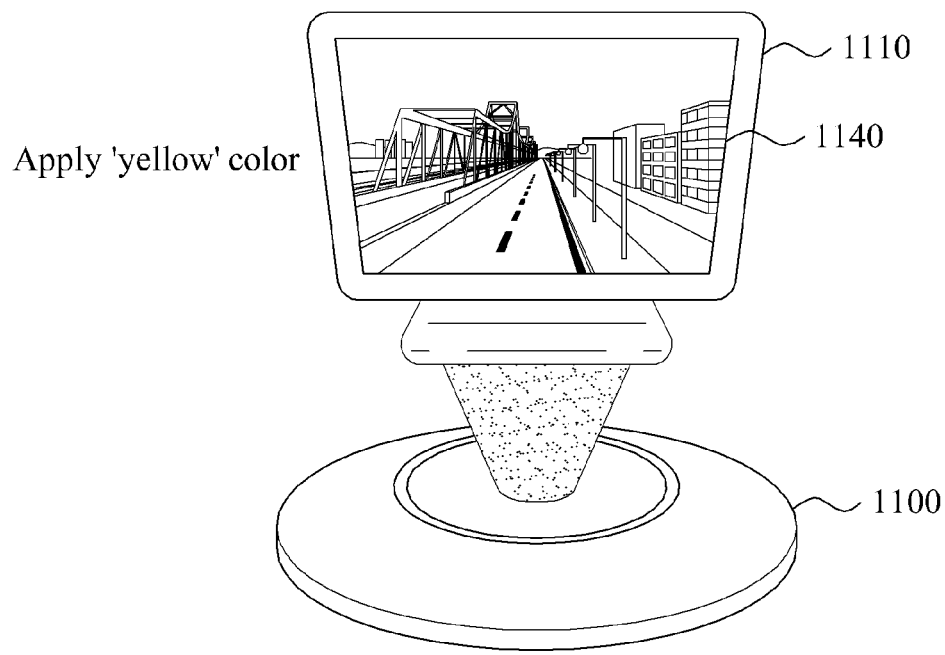

FIGS. 11A and 11B are diagrams to describe a user interface method of controlling an operation of a 3D virtual object by photographing a manipulating object.

Referring to FIG. 11A, a 3D display device 1100 displays a 3D virtual object 1110. The 3D display device 1100 may include a camera 1120 on one area. The camera 1120 is illustrated to be included in the 3D virtual object 1110, however, it is only an example. Thus, the camera 1120 may be mounted to a body of the 3D display device 1100.

When the manipulating object is detected in a 3D space matched with the 3D virtual object 1110, the 3D display device 1100 may photograph the manipulating object using the camera 1120. That is, as illustrated in FIG. 11A, when a contact, an insertion, or an approach of a banana 1130 is detected in the 3D space, the camera 1120 may generate a banana image by photographing the banana 1130.

The 3D display device 1100 may generate a user input signal by applying a representative pixel value of the banana image to a 3D virtual space. According to the user input signal, the 3D display device 1100 may control an operation of the 3D virtual object to verify the representative pixel value by analyzing the banana image and to display 3D virtual object by applying the representative pixel value to the 3D virtual object. Referring to FIG. 11B, a background screen of the 3D virtual object may be altered to a "yellow" color that is the representative pixel value of the banana image.

Referring to FIG. 11B, the representative pixel value of the banana image may be applied to the entire background screen of the 3D virtual object, or may be applied to a portion of the background screen.

When the manipulating object is detected in the 3D space after the banana image is generated, the 3D display device 1100 may set an area to which the representative pixel value of the banana image is to be applied by tracking x, y, z coordinate information along a contact and a movement of the manipulating object in the 3D space. By applying the "yellow" color that is the representative pixel value of the banana image to a portion of the area set in the above manner, a color of the 3D virtual object may be partially altered based on the necessity.

Figure 12A:
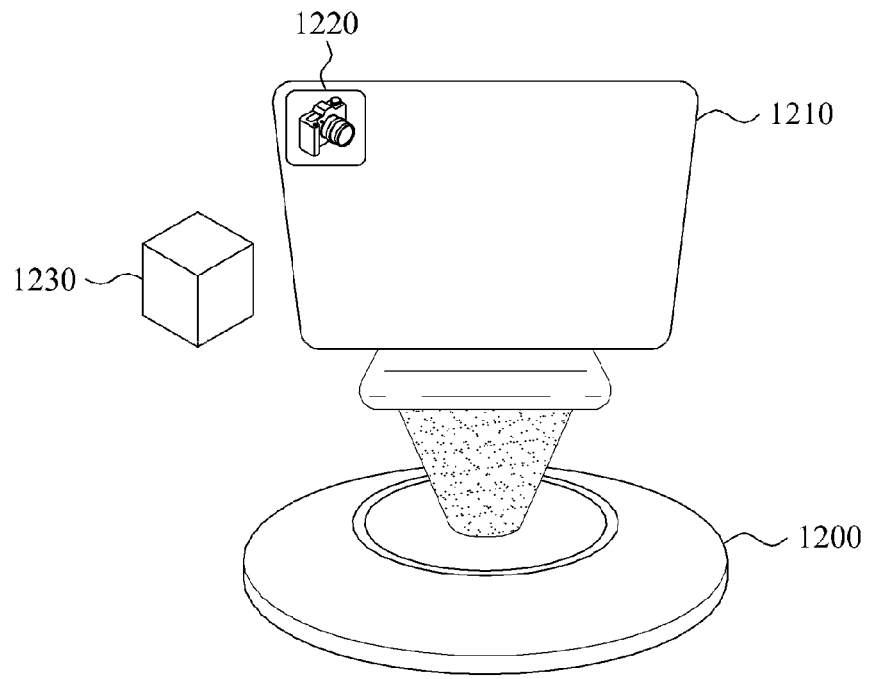
Figure 12B:
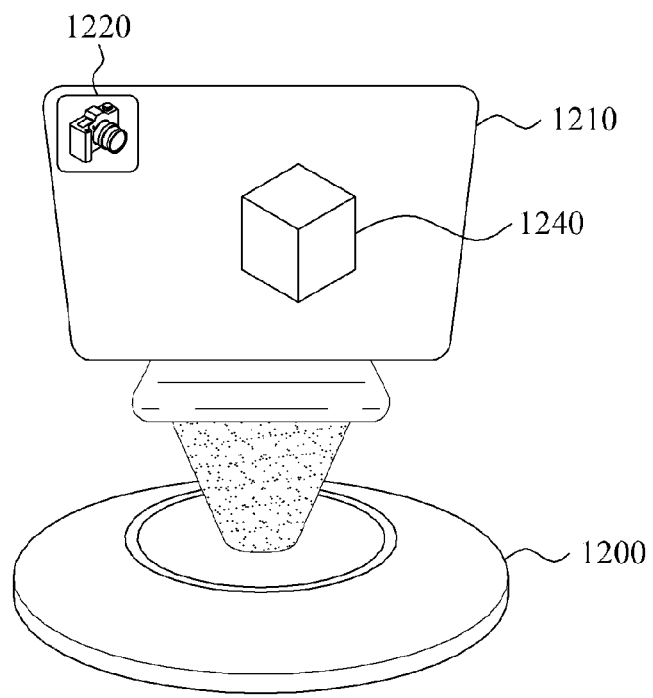

FIGS. 12A and 12B are diagrams to describe a user interface method of controlling an operation of a 3D virtual object by photographing a manipulating object.

Referring to FIG. 12A, a 3D display device 1200 displays a 3D virtual object 1210. The 3D display device 1200 may include a camera 1220 on one area.

When the manipulating object is detected in a 3D space matched with the 3D virtual object 1210, the 3D display device 1200 may photograph the manipulating object using the camera 1220. That is, referring to FIG. 12A, when a contact, an insertion, or an approach of a box 1230 in a rectangular shape is detected in the 3D space, the camera 1220 may generate a box image by photographing the box 1230.

The 3D display device 1200 may generate shape information of the box by detecting the box 1230 from the box image, and may generate a user input signal for displaying the shape information. The shape information of the box may include 2D image data or 3D image data indicating a shape or a state of the box.

According to the user input signal, the 3D display device 1200 may control an operation of the 3D virtual object to display 2D square image data or 3D rectangular image data corresponding to the box 1230. By this operation, the 3D display device 1200 may generate and display required image data when executing an application such as a drawing and an edition.

Figure 13:
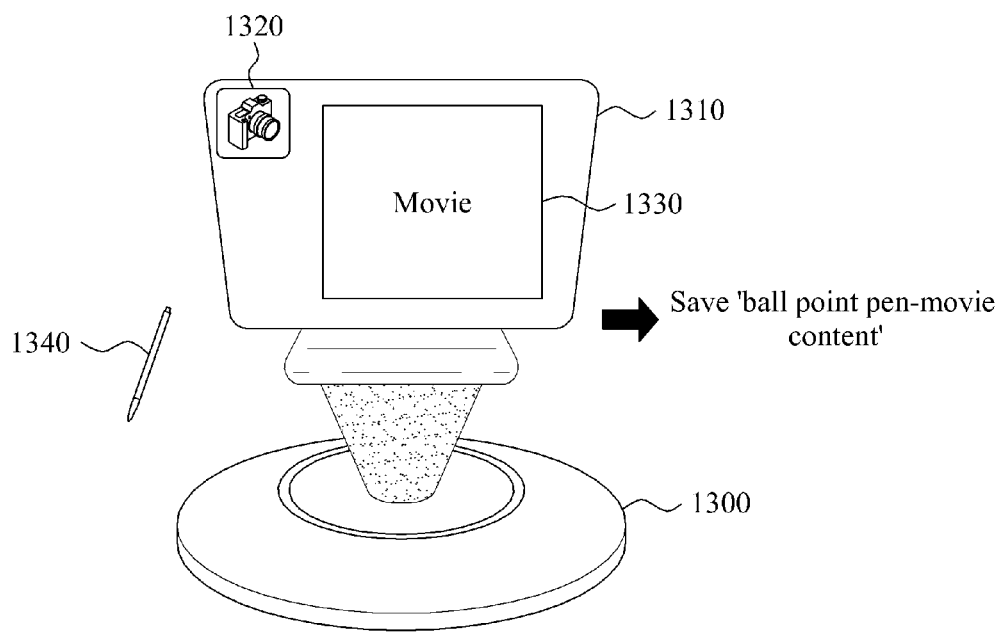

FIG. 13 is a diagram to describe a user interface method of controlling an operation of a 3D virtual object using a manipulating object.

Referring to FIG. 13, a 3D display device 1300 displays movie content 1330 on a 3D virtual object 1310.

When a ballpoint pen 1340 is detected in a 3D space matched with the 3D virtual object 1310 during an execution of the movie content 1330, the 3D display device 1300 may link the ballpoint pen 1340 and the movie content 1330 and may generate a user input signal for storing the linked ballpoint pen 1340 and movie content 1330.

Although not illustrated in FIG. 13, the 3D display device 1300 may generate a ballpoint pen image by photographing the ballpoint pen 1340 using a camera 1320 provided in the 3D display device 1300. The 3D display device 1300 may detect the ballpoint pen 1340 corresponding to the manipulating object from the ballpoint pen image and may link the ballpoint pen 1340 and the movie content 1330 in execution.

The 3D display device 1300 may generate the user input signal for storing the linked ballpoint pen 1340 and movie content 1330. In response to the user input signal, the 3D display device 1300 may store the linked ballpoint pen 1340 and movie content 1330 in a separate memory. That is, the 3D display device 1300 may store 'ballpoint pen-movie content'.

When the ballpoint pen 1340 is detected gain in the 3D space matched with the 3D virtual object 1310, the 3D display device 1300 may generate a user input signal for executing the movie content 1330 linked to the ballpoint pen 1340. In response to the user input signal, the 3D display device 1300 may read and execute the movie content 1330 linked to the ballpoint pen 1340.

According to embodiments of FIGS. 6A through 13, the 3D display devices 700, 800, 900, 1000, 1100, 1200, and 1300 may control an operation of a 3D virtual object by detecting a manipulating object in a 3D space matched with the 3D virtual object, and may provide a user interface suitable for a 3D display environment. Accordingly, a user may use the 3D virtual object itself as a user interface screen and thus, may readily control a variety of operations configurable through the 3D virtual object.

Figure 14:
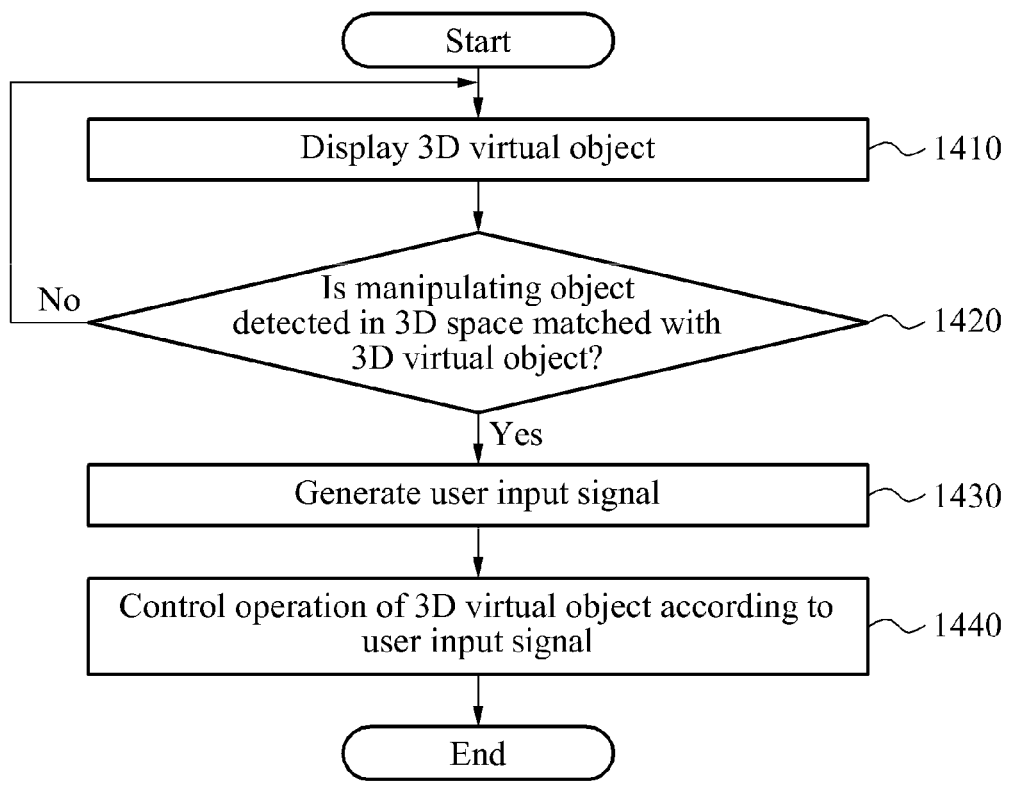
FIG. 14 is a flowchart illustrating a user interface method according to an embodiment.

FIG. 14 is a flowchart illustrating a user interface method according to an embodiment. Referring to FIG. 14, in operation 1410, a 3D display device according to an embodiment displays a 3D virtual object. When the 3D virtual object is displayed, the 3D display device may virtually generate a 3D space matched with the 3D virtual object.

When a manipulating object is detected in the 3D space matched with the 3D virtual object in operation 1420, the 3D display device generates a user input signal according to the manipulating object in operation 1430.

In operation 1440, the 3D display device controls an operation of the 3D virtual object according to the user input signal.

FIGS. 15 through 21 are flowcharts illustrating a user interface method according to various embodiments.

Figure 15:
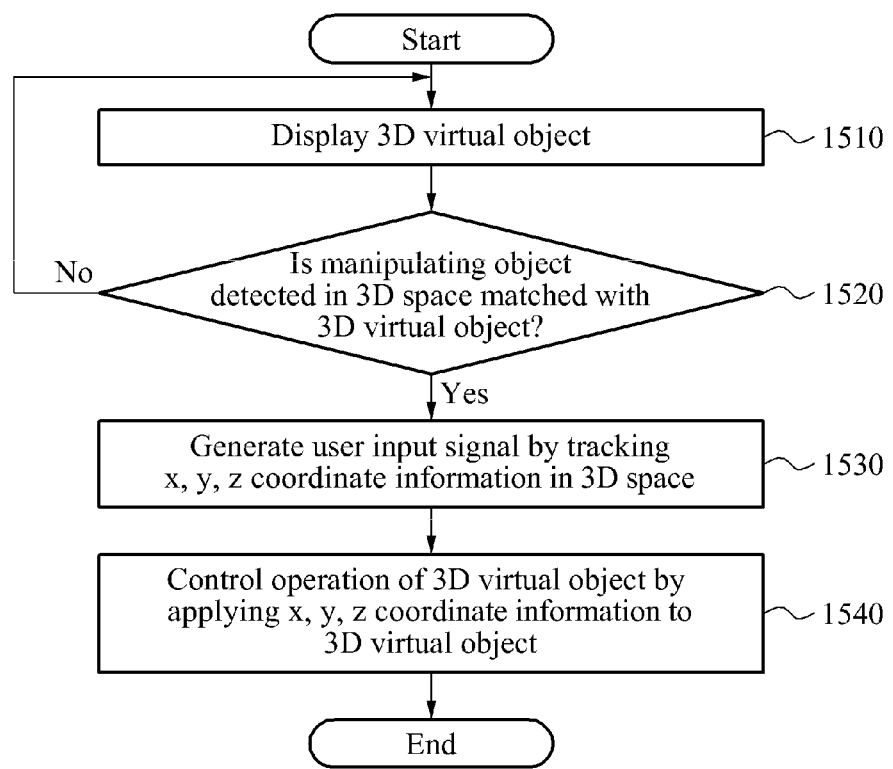
FIGS. 15 through 21 are flowcharts illustrating a user interface method according to various embodiments.

Referring to the embodiment of FIG. 15, in operation 1510, a 3D display device according to an embodiment displays a 3D virtual object.

When a manipulating object is detected in a 3D space matched with the 3D virtual object in operation 1520, the 3D display device generates a user input signal by tracking x, y, z coordinate information in the 3D space in operation 1530.

In operation 1540, the 3D display device controls an operation of the 3D virtual object by applying the x, y, z coordinate information to the 3D virtual object.

Figure 16:
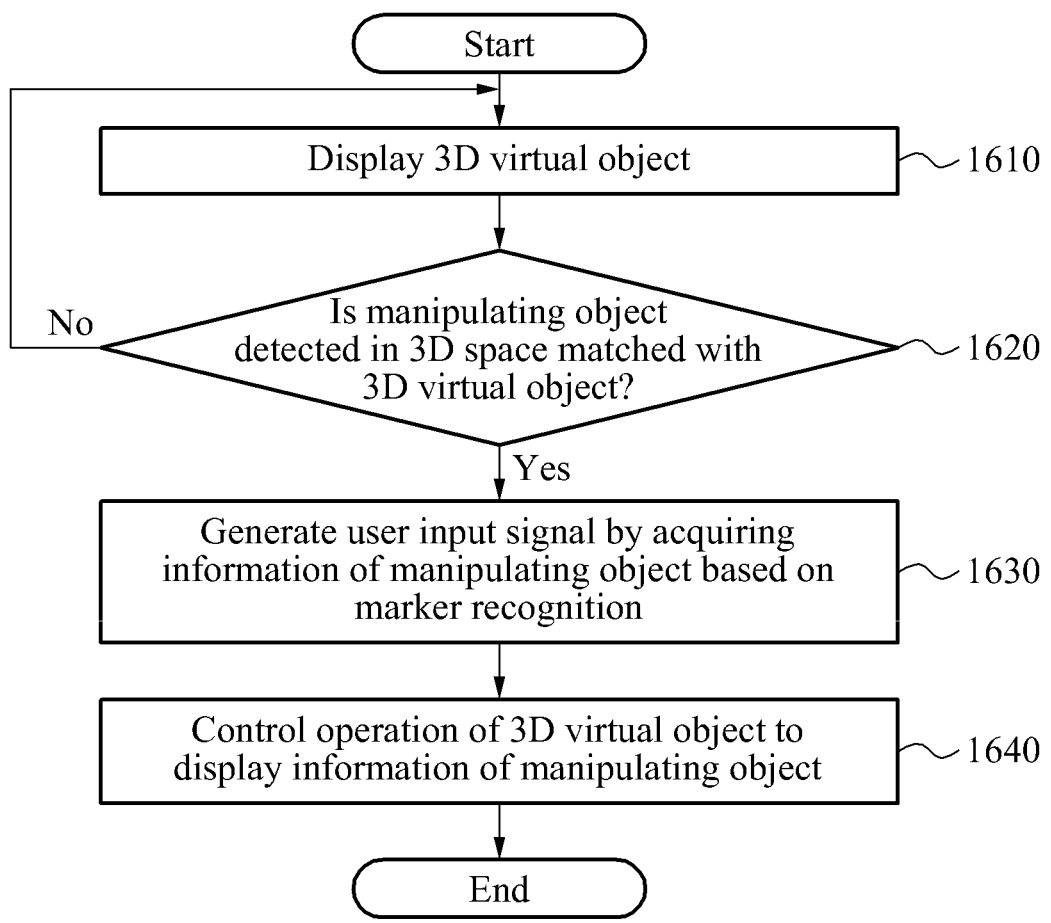

Referring to the embodiment of FIG. 16, in operation 1610, a 3D display device according to an embodiment displays a 3D virtual object.

When a manipulating object is detected in a 3D space matched with the 3D virtual object in operation 1620, the 3D display device generates a user input signal by acquiring a shape of the manipulating object based on marker recognition in operation 1630. In detail, when an insertion or an approach of the manipulating object including a marker is detected in the 3D space, the 3D display device may recognize the marker and may acquire the shape of the manipulating object corresponding to the marker. Accordingly, the 3D display device may generate a user input signal including the shape of the manipulating object.

In operation 1640, the 3D display device controls an operation of the 3D virtual object to display the shape of the manipulating object.

Figure 17:
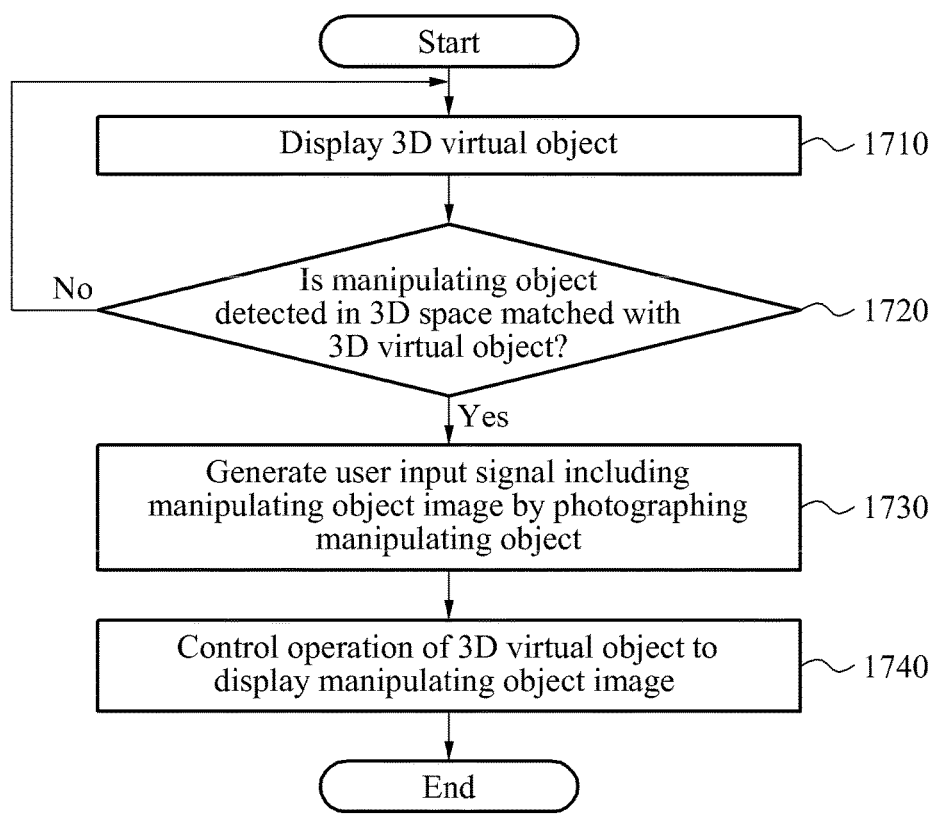

Referring to the embodiment of FIG. 17, in operation 1710, a 3D display device according to an embodiment displays a 3D virtual object.

When a manipulating object is detected in a 3D space matched with the 3D virtual object in operation 1720, the 3D display device generates a user input signal including a manipulating object image by photographing the manipulating object in operation 1730.

In operation 1740, the 3D display device controls an operation of the 3D virtual object to display the manipulating object image included in the user input signal.

Figure 18:
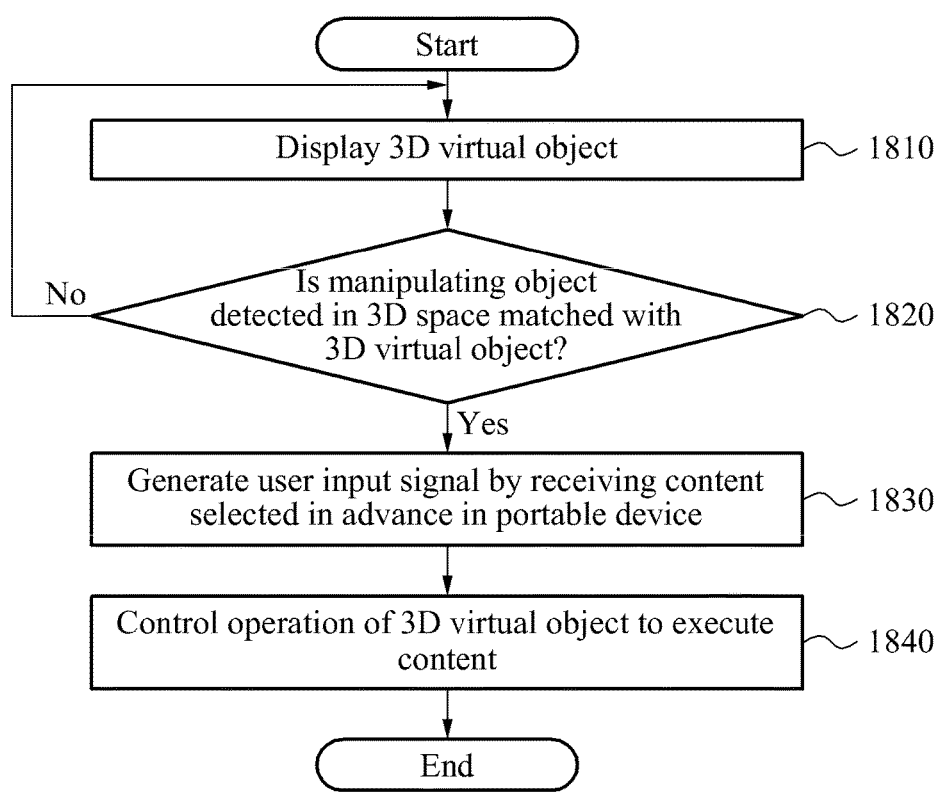

Referring to the embodiment of FIG. 18, in operation 1810, a 3D display device according to an embodiment displays a 3D virtual object.

When a portable device is detected in a 3D space matched with the 3D virtual object in operation 1820, the 3D display device generates a user input signal by receiving content selected in advance in the portable device in operation 1830.

In operation 1840, the 3D display device controls an operation of the 3D virtual object to execute content included in the user input signal.

Figure 19:
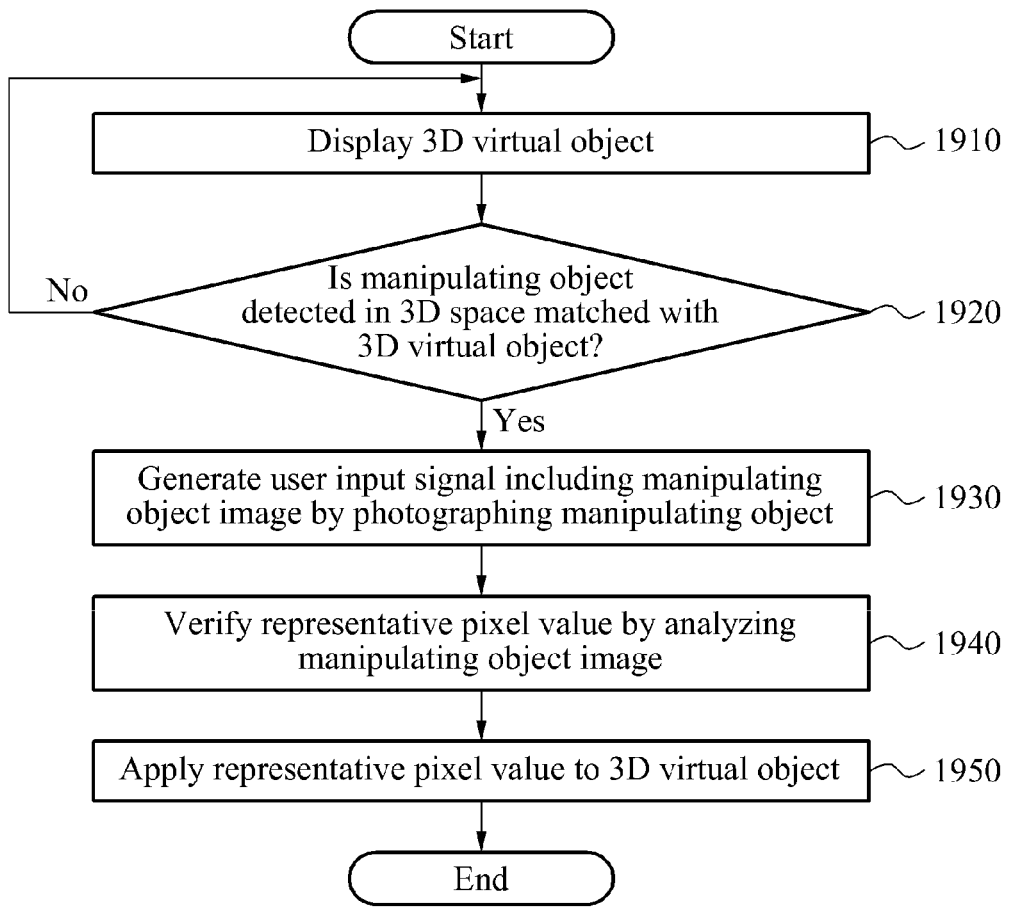

Referring to the embodiment of FIG. 19, in operation 1910, a 3D display device according to an embodiment displays a 3D virtual object.

When a manipulating object is detected in a 3D space matched with the 3D virtual object in operation 1920, the 3D display device generates a user input signal including a manipulating object image by photographing the manipulating object in operation 1930. In this example, the user input signal including the manipulating object image may be used to apply a representative pixel value of the manipulating object image to a background screen.

In response to the user input signal, the 3D display device verifies a representative pixel value by analyzing the manipulating object image in operation 1940, and applies the representative pixel value to the 3D virtual object in operation 1950. That is, the 3D display device may alter a color so that the background screen of the 3D display device has the representative pixel value.

Figure 20:
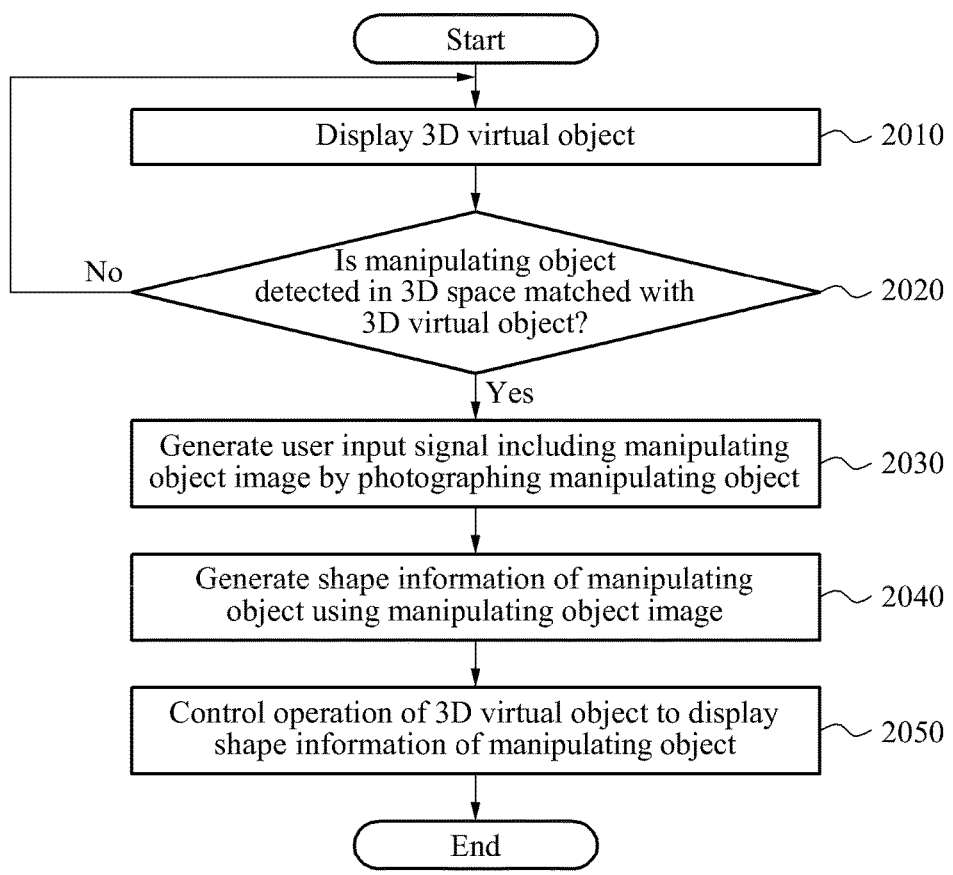

Referring to the embodiment of FIG. 20, in operation 2010, a 3D display device according to an embodiment displays a 3D virtual object.

When a manipulating object is detected in a 3D space matched with the 3D virtual object in operation 2020, the 3D display device generates a user input signal including a manipulating object image by photographing the manipulating object in operation 2030. In this example, the user input signal including the manipulating object image may be used to display shape information of the manipulating object.

According to the user input signal, the 3D display device controls an operation of the 3D virtual object to generate shape information of the manipulating object using the manipulating object image in operation 2040 and to display the shape information in operation 2050.

Figure 21:
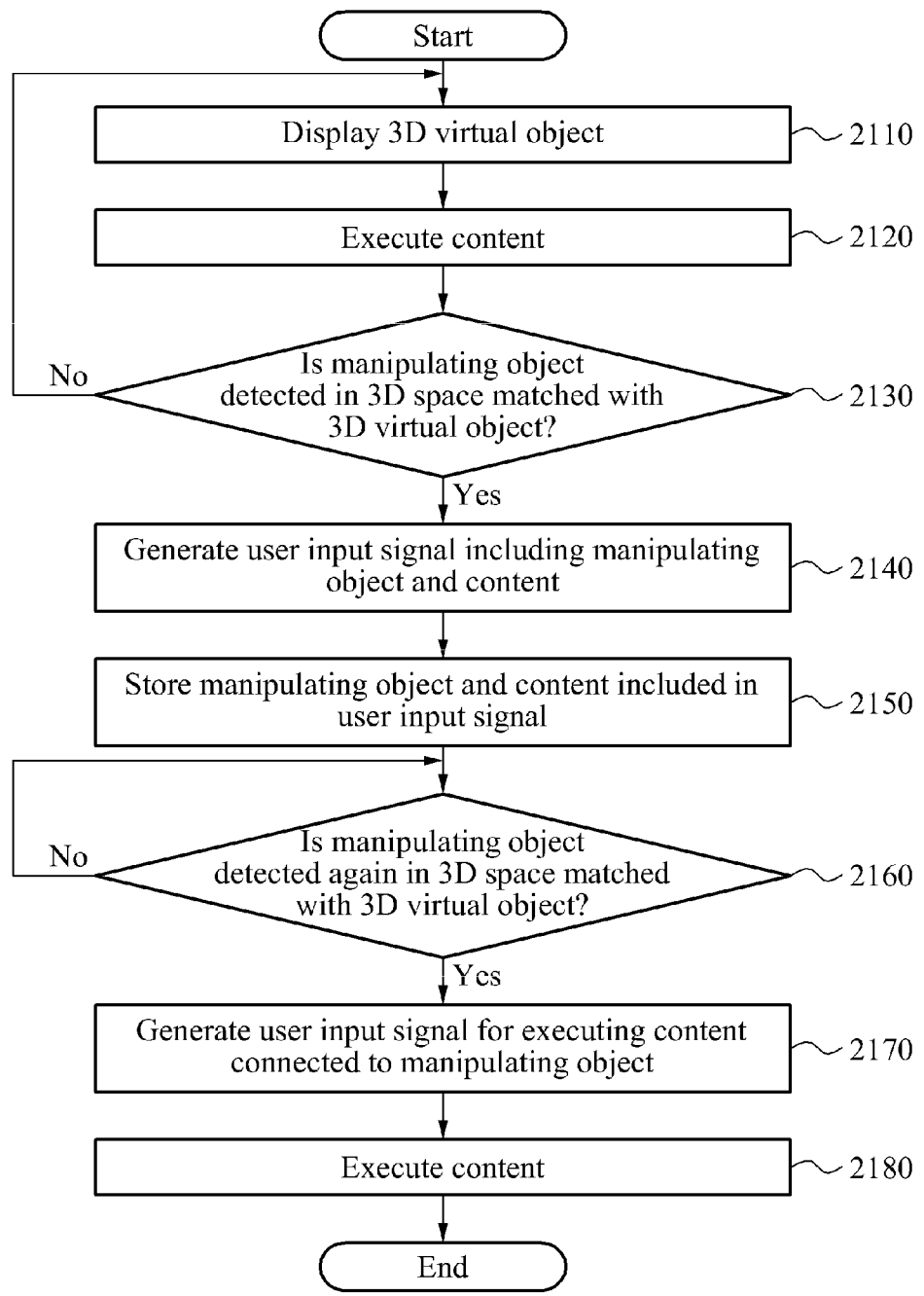

Referring to the embodiment of FIG. 21, a 3D display device according to an embodiment displays a 3D virtual object in operation 2110 and executes content through the 3D virtual object in operation 2120.

When a manipulating object is detected in a 3D space matched with the 3D virtual object in operation 2130, the 3D display device generates a user input signal including the manipulating object and content in execution in operation 2140. In this example, the 3D display device may link the manipulating object and the content included in the user input signal. The user input signal may be used to store the manipulating object and the content.

In operation 2150, in response to the user input signal, the 3D display device stores the manipulating object and the content included in the user input signal.

When the manipulating object is detected again in the 3D space matched with the 3D virtual object in operation 2160, the 3D display device generates a user input signal for executing the content linked to the manipulating object in operation 2170 and executes the content in response to the user input signal in operation 2180. That is, when the manipulating object detected in operation 2130 is detected again, the user may read and execute the content linked to the manipulating object without performing a separate operation.

The methods according to embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments of the present invention, or vice versa.

Although a few example embodiments of the present invention have been shown and described, the present invention is not limited to the described example embodiments. Instead, it would be appreciated by those skilled in the art that changes may be made to these example embodiments without departing from the principles and spirit of the invention, the scope of which is defined by the claims and their equivalents.

What is claimed is:

1. A three-dimensional (3D) display device, comprising:
   a display configured to display a 3D virtual object;
   a user input signal generator configured to generate a user input signal by detecting a manipulating object for manipulating an operation of the 3D virtual object in a 3D space matched with the 3D virtual object, the manipulating object physically located in the 3D space, the user input signal generator including
     a detection sensor configured to detect the manipulating object in the 3D space, and
     a marker recognizer configured to recognize a marker physically located on a surface of the manipulating object in response to detection of the manipulating object in the 3D space, the recognizing detects a particular pattern physically located on the surface of the manipulating object from the marker and determines that the particular pattern corresponds to information associated with the manipulating object,
   the user input signal generator further configured to
     acquire the information associated with the manipulating object based on recognizing the marker located on the manipulating object, and
     generate the user input signal such that the user input signal includes the information associated with the manipulating object; and
   a controller configured to control the operation of the 3D virtual object according to the user input signal.

2. The 3D display device of claim 1, wherein the user input signal generator is configured to generate the user input signal based on tracking x, y, z coordinate information in the 3D space along a contact and a movement of the manipulating object when the manipulation object is detected in the 3D space.

3. The 3D display device of claim 2, wherein the controller is configured to control the operation of the 3D virtual object such that the operation of the 3D virtual object corresponds to the x, y, z coordinate information based on applying the x, y, z coordinate information included in the user input signal to the 3D virtual object matched with the 3D space.

4. The 3D display device of claim 1, wherein the controller is configured to control the operation of the 3D virtual object to display the information associated with the manipulating object in the user input signal or to transmit the information associated with the manipulating object to another display device.

5. The 3D display device of claim 1, wherein
   the user input signal generator includes a camera configured to generate a manipulating object image based on photographing the manipulating object when the manipulating object is detected in the 3D space, and
   the user input signal generator is configured to generate the user input signal such that the user input signal includes the manipulating object image.

6. The 3D display device of claim 5, wherein the controller is configured to control the operation of the 3D virtual object to display the manipulating object image included in the user input signal.

7. The 3D display device of claim 5, wherein the controller is configured to
   control the operation of the 3D virtual object to verify a representative pixel value based on analyzing the manipulating object image included in the user input signal, and
   display the 3D virtual object based on applying the representative pixel value to the 3D virtual object.

8. The 3D display device of claim 5, wherein the controller is configured to
   control the operation of the 3D virtual object to generate shape information associated with the manipulating object based on the manipulating object image included in the user input signal, and
   display the shape information associated with the manipulating object.

9. The 3D display device of claim 1, wherein the user input signal generator is configured to
   link the manipulating object and content, and to generate the user input signal as a signal including the manipulating object and the content, when the manipulating object is detected in the 3D space during an execution of the content.

10. The 3D display device of claim 9, wherein the controller is configured to store the manipulating object and the content included in the user input signal.

11. The 3D display device of claim 10, wherein the user input signal generator is configured to read the content linked to the manipulating object and to generate the user input signal such that the user input signal is associated with executing the content when the manipulating object is detected again in the 3D space.

12. The 3D display device of claim 1, wherein the user input signal generator is configured to detect, as the manipulating object, at least one of a user body, an object, and a portable device having a communication function in the 3D space.

13. The 3D display device of claim 12, wherein
   the user input signal generator includes a communicator configured to communicate with the portable device, and the user input signal generator is configured to receive content selected in advance in the portable device through the communicator and to generate the user input signal as a signal including the content when the portable device is detected in the 3D space.

14. The 3D display device of claim 13, wherein the controller is configured to control the operation of the 3D virtual object to execute the content comprised in the user input signal.

15. The 3D display device of claim 1, wherein
the particular pattern physically located on the surface of the manipulating object is a barcode physically located on the surface of the manipulating object, the barcode corresponding to information associated with the manipulating object.

16. The 3D display device of claim 1, wherein
the information associated with the manipulating object, acquired based on recognizing the marker located on the manipulating object, includes at least one instance of information of
a provider associated with the manipulating object,
a 2D or 3D game,
a created date associated with the manipulating object,
an online sales location associated with the manipulating object,
an offline sales location associated with the manipulating object, and
a price associated with the manipulating object.

\* \* \* \* \*